(12) United States Patent  (10) Patent No.: US 8,150,384 B2
Abifaker et al.  (45) Date of Patent: Apr. 3, 2012

(54) METHODS AND APPARATUSES FOR GESTURE BASED REMOTE CONTROL

(75) Inventors: Chadia Abifaker, San Diego, CA (US); Ruben M. Velarde, Chula Vista, CA (US)

(73) Assignee: Qualcomm Incorporated, San Diego, CA (US)

(*) Notice: Subject to any disclaimer, the term of this patent is extended or adjusted under 35 U.S.C. 154(b) by 104 days.

(21) Appl. No.: 12/816,885

(22) Filed: Jun. 16, 2010

(65) Prior Publication Data

US 2011/0312311 A1  Dec. 22, 2011

(51) Int. Cl.
*H04M 3/00* (2006.01)

(52) U.S. Cl. ........................................ 455/418; 455/419

(58) Field of Classification Search ....... 455/418–422.1, 455/434–435, 456, 566; 725/35–37; 348/154–156, 348/208; 345/156–158
See application file for complete search history.

(56) References Cited

U.S. PATENT DOCUMENTS

| 6,603,420 | B1* | 8/2003 | Lu ................................. | 341/176 |
| 7,024,228 | B2* | 4/2006 | Komsi et al. .................. | 455/566 |
| 7,123,180 | B1* | 10/2006 | Daniell et al. ................ | 341/176 |
| 2004/0218104 | A1 | 11/2004 | Smith et al. | |
| 2005/0212753 | A1 | 9/2005 | Marvit et al. | |
| 2005/0212911 | A1 | 9/2005 | Marvit et al. | |
| 2007/0130582 | A1 | 6/2007 | Chang et al. | |
| 2009/0153289 | A1* | 6/2009 | Hope et al. ..................... | 340/5.1 |
| 2009/0239587 | A1 | 9/2009 | Negron et al. | |
| 2009/0262074 | A1 | 10/2009 | Nasiri et al. | |
| 2010/0060569 | A1* | 3/2010 | Shamilian .................... | 345/156 |

FOREIGN PATENT DOCUMENTS

| EP | 1337965 A2 | 8/2003 |
| EP | 1496485 A2 | 1/2005 |
| WO | WO0017737 A1 | 3/2000 |

OTHER PUBLICATIONS

International Search Report and Written Opinion—PCT/US2011/040766, ISA/EPO—Sep. 8, 2011.
Sung-Jung Cho et al., "Magic Wand: A Hand-Drawn Gesture Input Device in 3-D Space with Inertial Sensors", Frontiers in Handwriting Recognition, 2004, IWFHR-9 2004. Ninth Intern Ational Workshop on Tokyo, Japan Oct. 26-29, 2004, Piscataway, NJ, USA,IEEE, Oct. 26, 2004, pp. 106-111, XP010750387, DOI: 10.1109/IWFHR.2004.66 ISBN: 978-0-7695-2187-9.

* cited by examiner

*Primary Examiner* — Kent Chang
*Assistant Examiner* — Kashif Siddiqui

(57) ABSTRACT

Methods and apparatuses are provided that may be implemented in and/or with a mobile device to allow gesture based remote control of one or more controllable devices.

74 Claims, 4 Drawing Sheets

METHODS AND APPARATUSES FOR GESTURE BASED REMOTE CONTROL

BACKGROUND

1. Field

The subject matter disclosed herein relates to electronic devices, and more particularly to methods and apparatuses for use in or with a mobile device to remotely control one or more controllable devices.

2. Information

Wireless communication systems are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity among a plethora of devices, both fixed and portable. Many of these wireless systems are coupled together through other communication systems and resources to promote even more communication and sharing of information.

Advanced applications for mobile devices (e.g., cellular phones, PDAs, notebook computers, remote controls for entertainment systems, etc.) have been used for providing commands to a controllable device through some type of communication link. Typically, buttons and/or an interface may receive selections from a user to provide commands to a controllable device. Such commands may affect the operation of the controllable device in some fashion (e.g., turn on or off, increase or decrease volume of a home entertainment system, affecting room lighting, thermostatic controls, etc.).

A user typically provides inputs to a mobile device by pressing buttons, interacting with a touch screen. For example, while activating a particular application on a mobile device, a user may select an icon representative of a particular device to be controlled, and then provide inputs to the mobile device via buttons and/or a touch screen. Such action may be distracting and time consuming for a user.

SUMMARY

In accordance with certain aspects, techniques are provided for use in and/or with a mobile device to allow remote control of one or more controllable devices. Such remote control may, for example, be based on gestures that a user makes and/or other user inputs. Such remote control may, for example, occur even in circumstances wherein a mobile device is out of a line of sight to a controllable device. Thus, such remote control may, for example, occur in circumstances wherein a mobile device is near by and/or far removed from a controllable device.

By way of non-limiting example, a method may be implemented in which an orientation of a mobile device may be associated with a direction toward a location of a controllable device. A selection of the controllable device may then be indicated in some manner, and one or more commands associated with the selected controllable device may be determined. For example, one or more commands associated with a selected controllable device may be determined based, at least in part, on user input obtained via one or more inertial sensors of the mobile device. The mobile device may then initiate transmission of such command(s) to a selected controllable device and/or a plurality of selected controllable devices either directly and/or indirectly.

By way of further example, a method may be implemented in which a mobile device is programmed and/or otherwise learns how to remotely control a controllable device. Here, for example, a mobile device may obtain an estimated location of a controllable device, and process signals from one or more inertial sensors of the mobile device to characterize one or more gestures. The mobile device may, for example, be programmed to associate one or more commands with the controllable device based, at least in part, on the characterized gesture(s). The mobile device may, for example, be programmed to select a controllable device for receiving such commands responsive to an orientation of the mobile device with a direction toward the estimated.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
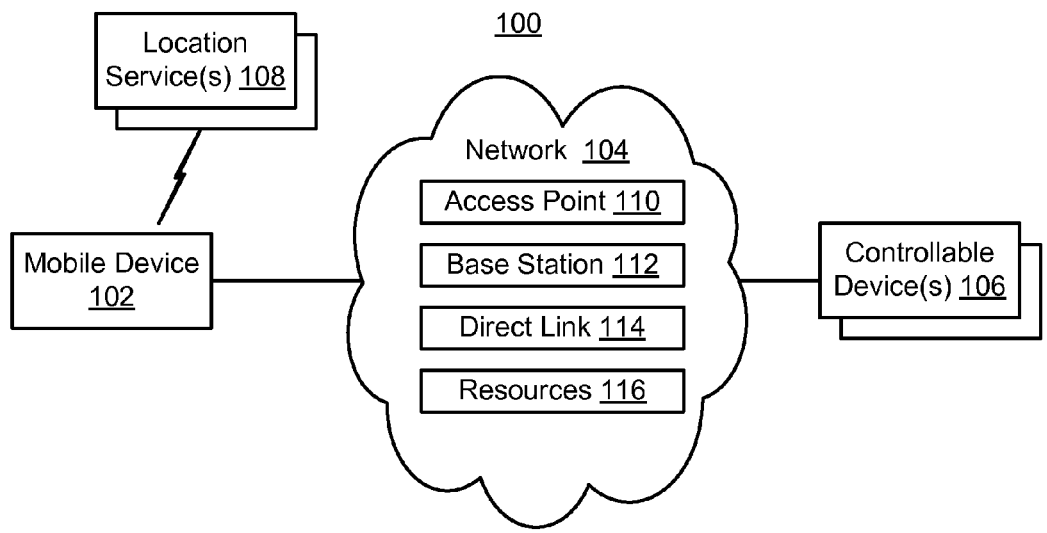
FIG. 1 is a schematic block diagram illustrating an exemplary environment that includes a mobile device to remotely control one or more controllable devices, in accordance with an implementation.

According to certain example embodiments, a mobile device may be enabled to perform gesture based remote control of one or more controllable devices.

A mobile device may, for example, comprise one or more inertial motion sensors such as, for example, a compass, gyroscope, accelerometer and/or magnetometer. Measurements from such sensors may be processed to determine an orientation of the device (e.g., roll, pitch and yaw) and/or determine an angle of orientation of the mobile device relative to a reference datum. Additionally, while a user is holding the mobile device, measurements from such sensors may be used to detect and/or characterize particular hand gestures (e.g., rolling the wrist, upward, downward, left, right, etc.). Here, a user may make such gestures to initiate commands to a remotely controllable device.

According to certain example embodiments, locations of remotely controllable devices are known. A user may select a controllable device to receive commands by pointing a mobile device in a direction toward the known location of the controllable device. Here, the location of the mobile device may be determined using anyone of several location determination techniques such as, for example, GPS, advanced forward trilateration, just to name a couple of examples. As mentioned above, the directional orientation of the mobile device may be determined from sensors on-board (e.g., compass). As such, a line or ray may be projected from the known location of the mobile device in a direction according to the directional orientation of the mobile device. If the projected line or ray passes through or near the location of the remotely controllable device, the mobile device may select the controllable device to receive inputs.

Once the controllable device has been selected to receive inputs, the user may make certain gestures while holding the device to initiate transmission of commands to the controllable device. As discussed above, the mobile device may be programmed to detect and/or characterize such gestures based upon signals from inertial sensors. Accordingly, other than pointing the mobile device in the general direction of the remotely controllable device and making particular gestures while holding the device, a user may select a controlled device and initiate transmission of commands to the selected device without interacting with buttons or a touch screen, etc.

According to certain example embodiments, a mobile device may communicate with a remotely controlled device using anyone of several types of data links (e.g., WiFi, Bluetooth, cellular network, etc.). In one particular implementation, a remotely controllable device may be associated with an IP address and be capable of receiving commands from a mobile device in a TCP/IP session. As such, there is no need for a line of sight path between a remotely controlled device and a mobile device providing commands to the remotely controlled device (e.g., as typically desired for an IR link).

Additionally, an authorization and/or authentication protocol may control access to remotely controlled devices by mobile devices. For example, before receiving commands from a mobile device, a remotely controlled device may query the mobile device for security metadata and selectively receive commands upon authenticating the source of the commands.

According to certain example implementations, a mobile device may be programmed to provide inputs to remotely controllable devices. In one example, a user may provide a location of the mobile device by supplying inputs from a keypad. Alternatively, a user may register a location of a remotely controllable device by holding the mobile device near or next to the remotely controllable device, and associating the current location of the mobile device with a fixed location of the remotely controllable device. As discussed above, such a mobile device may be capable of determining its own location using well known techniques. While there may be some default gestures for providing particular inputs, a user may also program certain hand gestures (e.g., while holding the mobile device). Inertial sensor signals generated from such gestures may be used to create a stored signature for use in detecting and/or characterizing hand gestures in the future, and initiating commands to a remotely controlled device accordingly.

With this in mind, in accordance with certain example implementations, methods and/or apparatuses maybe provided for use in and/or with a mobile device to allow a user of the mobile device to select and control one or more controllable devices in some manner. With such methods and/or apparatuses, a user who may be located some distance away from a controllable device may nonetheless select and control the controllable device in some manner using a mobile device.

By way of an initial non-limiting example, a user at their place of employment may select and control a controllable device such as an appliance in their home using a smart phone. Here, the distance between a user's location and a location of the controllable device may vary greatly. For example, a user's location may be tens or hundreds of meters and/or even several kilometers away from the location of the controllable device. Indeed, the line of sight from the user to the controllable device may be blocked by various natural and/or man-made structures.

To allow a user to select and control one or more controllable devices from close and/or far distances, for example, certain example methods and/or apparatuses may be implemented in a mobile device to associate an orientation of the mobile device with a direction toward a location of a controllable device. For example, an orientation may be determined based, at least in part, using one or more inertial sensors (e.g., an accelerometer, a gyroscope, or the like, and/or possibly a compass, a magnetometer, a barometer, etc.), and/or certain information derived using a location service receiver (e.g., a Global Navigation Satellite System (GNSS) receiver, a location-based service (LBS), etc.), a compass and/or a magnetometer, etc. An orientation of a mobile device may, for example, be with respect to one or more specific up/down, top/bottom, etc., positions relating to the use of the mobile device. For example, a keyboard or display may have a particular operating orientation that may relate to a top and bottom when viewed or otherwise used by a user. In certain example implementations, one or more limitations may be identified (e.g., by default, in advance, based on user input(s), etc.) regarding one or more locations, distances, time periods, allowable commands, etc., associated with the use of the mobile device and/or controllable device.

In certain example implementations, a mobile device may determine a direction toward a location of a controllable device based, at least in part, on an estimated location of the mobile device and an orientation of the mobile device. Here, for example, an estimated location of a mobile device may be based, at least in part, on one or more signals associated with a location service receiver, and a determined direction may represent a projected line or ray extending from the estimated location of a mobile device towards the location of a controllable device. In certain implementations, for example, to account for errors in one or more location estimates and/or orientation determinations, a determined direction may comprise a directional region of space. Here, for example, a directional region of space may extend in some fashion from an estimated location of a mobile device towards the location of a controllable device.

In certain example implementations, a mobile device may be programmed in advance as to the location of a controllable device and/or one or more commands associated with the controllable device. Some example techniques for programming and/or training a mobile device are described in greater detail below.

As described in the example above, a mobile device knowing its estimated location and orientation, as well as the location of one or more controllable devices, may then indicate and/or otherwise provide for a selection of a controllable device (e.g., to subsequently send control commands). For example, the location of a controllable device may be determined to be in the direction (e.g., on, within and/or otherwise sufficiently near a projected line and/or directional region of space). A selection of a controllable device may, for example, be automatic and/or otherwise affected by user input. For example, in certain situations a user may verify, change, or otherwise affect a selection of a controllable device. Thus, if there happen to be two or more controllable devices in the direction, then a user may be prompted or otherwise permitted to provide user input to resolve such a conflict. By way of an initial example, informative and/or selectable images or icons, etc., may be displayed or otherwise presented to a user to support selection of one or more controllable device(s). It should be noted that while the examples presented herein tend to illustrate selection of a single controllable device, there may be instances wherein a selected controllable device actually comprises a plurality of controllable devices.

As described in greater detail below, various types of user interfaces, sensors and/or user input associated with a mobile station may be employed to support selection of a controllable device and/or subsequent control of a selected controllable device. By way of example, to obtain user input associated with a selection of a controllable device a mobile device may comprise an interactive or touch-screen display, a microphone, a camera, a button or keypad, one or more inertial sensors, and/or the like. Similarly, for example, a selection of a controllable device and/or other information regarding the various processes herein may be indicated to a user via a visual interface (e.g., a display, an indicator, etc.), an audio interface (e.g., a speaker, a buzzer, etc.), and/or a tactile interface (e.g., a vibrating mechanism, etc.).

In other examples, such interfaces, sensors and/or user input may also support user authentication as may be desired for access control relating to one or more controllable devices and/or supporting communication services and/or other like resources.

Continuing with the example above, a mobile device having a presently selected controllable device may then determine one or more commands associated with the selected controllable device. For example, one or more commands may be determined based, at least in part, on user input obtained via one or more inertial sensors of the mobile device. For example, one or more commands may be determined based, at least in part, on user input obtained via one or more user interfaces of the mobile device.

By way of example, one or more commands may identify at least one physical act performed by a person (e.g., the user, and/or one or more others) and/or at least one physical gesture performed using the mobile device, as determined based, at least in part, on one or more signals associated with the one or more inertial sensors. In certain example implementations, a physical act may result in identifiable motion(s), audio waveforms, visual images, and/or the like, as measured, recorded and/or captured by the mobile device.

Continuing further with the example above, a mobile device having determined one or more commands associated with a selected controllable device may initiate transmission of the command(s) to the selected controllable device. Here, for example, a mobile device may transmit one or more messages associated with the selected controllable device and command(s) to one or more network resources capable of communicating the desired commands to the selected controllable device. For example, a mobile device may transmit one or more messages via wireless signals to an access point, base station, and/or the like associated with one or more communication networks.

A networked resource may, for example, forward desired commands to the selected controllable device with or without providing additional data processing. Thus, in certain example implementations, a mobile station may be capable of generating or otherwise identifying a desired command that the selected controllable device may receive and process accordingly. Here, in certain example implementations, a mobile device may therefore transmit (and receive) one or more signals over a direct communication link to the selected controllable device. In other example implementations, a network resource may provide an additional data processing capability to generate or otherwise identify a desired command that the selected controllable device may receive and process accordingly.

In certain example implementations, a mobile device may also obtain status information associated with a selected controllable device and present feedback to a user based, at least in part, on the status information. For example, a current state of a selected controllable device may be determined or monitored, and feedback provided to the user to further support a selection and/or control process.

As mentioned previously, a mobile device may be programmed to select and control a controllable device in advance. Here, for example, a mobile device may obtain a location of a controllable device. A location of a controllable device may, for example, be provided to the mobile device and/or may be estimated using the mobile device in some manner. Here, for example, a network resource and/or a controllable device, and/or user input may identify a predetermined location of a controllable device. In other examples, one or more location services may be used to estimate a location of a controllable device (e.g., by communicating with the controllable device via a network, by identifying a location of other supporting resources such as an Internet Service Provider (ISP) resource, etc.). For example, a mobile device may estimate a location of a controllable device with a location service receiver (e.g., a GNSS receiver), and/or possibly with further assistance of one or more network resources. Data associated with a location of a controllable device may be stored in memory within the mobile device.

A mobile device may also process signals from one or more inertial sensors and/or other interfaces to characterize one or more gestures and as being associated with one or more commands to select and/or control a controllable device. Thus, data associated with the characterized one or more gestures and associated commands may be stored in memory and used to later identify selection of and/or determine commands relating to a controllable device. For example, such data may be used to select a controllable device for receiving one or more commands responsive to an orientation of a mobile device with a direction toward a location of a controlled device. Such data may also, for example, include user authentication and/or other like access control information associated with a controllable device.

In certain example implementations, a mobile device may receive data which characterize one or more gestures. For example, certain controllable devices may have default gestures for which data may be downloaded or otherwise provided to a mobile device from the controlled device, one or more networked resources, and/or a computer readable medium.

In certain example implementations, a mobile device may similarly obtain data relating to operational information associated with a controllable device, access control information associated with controllable device and/or other resources or services, and/or identification information associated with a controllable device. For example, operational information may specify certain control parameters, techniques, limitations, etc. For example, access control information may identify and/or otherwise relate to protocols, credentials, codes, passwords, limitations, subscriptions, etc. For example, identification information may comprise a user manual, service manual, video/graphical and/or audio files, model and/or serial number information, network address, media access layer information, entity/owner contact information, etc. In certain example implementations, a camera of a mobile device may be used to obtain image information associated with a controllable device, and/or other identification information associated with a controllable device.

Attention is drawn now to FIG. 1, which is a schematic block diagram illustrating an example environment 100 comprising a mobile device 102, a network 104, one or more controllable device(s) 106, and one or more location service(s) 108.

Mobile device 102 is representative of any electronic device that may be reasonably be moved about by a user. By way of example but not limitation, mobile device 102 may comprise a computing and/or communication device such as a mobile telephone, smart phone, lap top computer, tablet computer, a personal computer, a wearable computer, a personal digital assistant, etc. Mobile device 102 may comprise electronic circuitry that is attached to other devices/mechanisms. For example, mobile device 102 may comprise a computing device installed within a vehicle that when controlled by a user or others may be moved about.

Device 102 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like.

Network 104 is representative of one or more wired and/or wireless communication networks and/or the like which enables communication between mobile device 102 and controllable device(s) 106. By way of example, network 104 may include a telecommunications and/or data network and/or services, cellular and/or other wireless networks, an intranet, the Internet, etc. Hence, as illustrated, network 104 may comprise an access point 110, a base station 112, a direct link 114, and/or one or more computing/communication resources 116. Resources 116 may comprise, for example, one or more computing devices, communication devices/resources, data storage devices, etc.

Location service(s) 108 is representative of one or more wireless signal based location services such as, a GNSS (e.g., GPS, etc.) or other like satellite and/or terrestrial locating service, a location based service (e.g., via a cellular network, a WiFi network, etc.).

Controllable device(s) 106 is representative of any electronic and/or electromechanical apparatus that may be controlled and/or otherwise operatively affected in some manner via one or more commands received via one or more electrical signals (e.g., transmitted using wires, waveguides, cables, optical fibers, and/or one or more wireless links). Controllable device(s) 106 may, for example, comprise mobile devices, computing devices, communication devices, entertainment devices, control mechanisms, machines, appliances, robots, vehicles, flying devices, aquatic devices, submersible devices, etc. Depending on the controllable device, one or more commands may be received and in response an operation and/or state may be affected.

Figure 2:
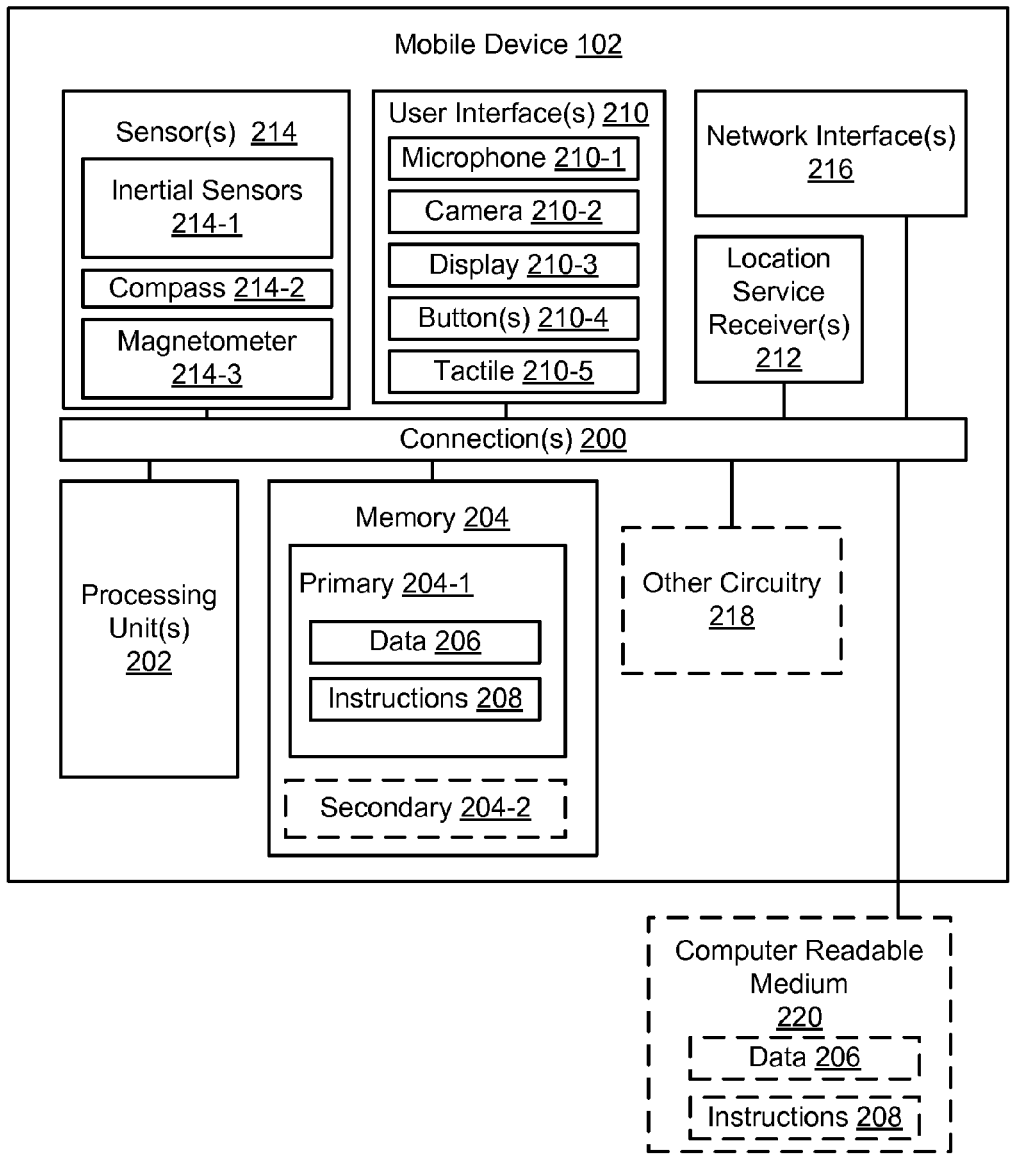
FIG. 2 is a schematic block diagram illustrating certain features of a mobile device, for example as in FIG. 1, capable of remotely controlling one or more controllable devices, in accordance with an implementation.

Reference is made next to FIG. 2, which is a schematic block diagram illustrating certain features of mobile device 102, for example as in FIG. 1, in accordance with an implementation.

As illustrated mobile device 102 may comprise one or more processing units 202 to perform data processing (e.g., in accordance with the techniques provided herein) coupled to memory 204 via one or more connections 200. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within mobile device 102. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 220. As illustrated, memory 204 and/or computer readable medium 220 may comprise data 206 and/or instructions 208 associated with data processing (e.g., in accordance with the techniques provided herein).

Mobile device 102 may, for example, further comprise one or more user interfaces 210, which may be coupled to one or more of connections 200. By way of example, user interfaces 210 may comprise a microphone 210-1, a camera 210-2, a display 210-3, one or more buttons/etc. 210-4, and/or one or more tactile interfaces 210-5 (e.g., a vibrating mechanism, etc.). Other user interfaces may comprise a biometric reader or other like authentication interface, a speaker or buzzer or other like audible interface, and/or various visual interfaces such as LEDs, lights, etc.

Mobile device 102 may, for example, as previously mentioned further comprise one or more location service receivers 212 and/or network interfaces 215, which may be coupled to one or more of connections 200.

Mobile device 102 may, for example, further comprise one or more sensors 214, which may be coupled to one or more of connections 200. In this example and as previously mentioned, sensors 214 may comprise one or more inertial sensors 214-1, a compass 214-2, a magnetometer 214-3, etc.

Mobile device 102 may, for example, further comprise other circuitry 218, etc., which may or may not be coupled to one or more of connections 200. Here, for example, other circuitry 218 may vary widely in its scope depending on other functionality and/or capabilities of mobile device 102. For example, other circuitry 218 may comprise a power supply, a device to access a computer readable medium, etc.

Figure 3:
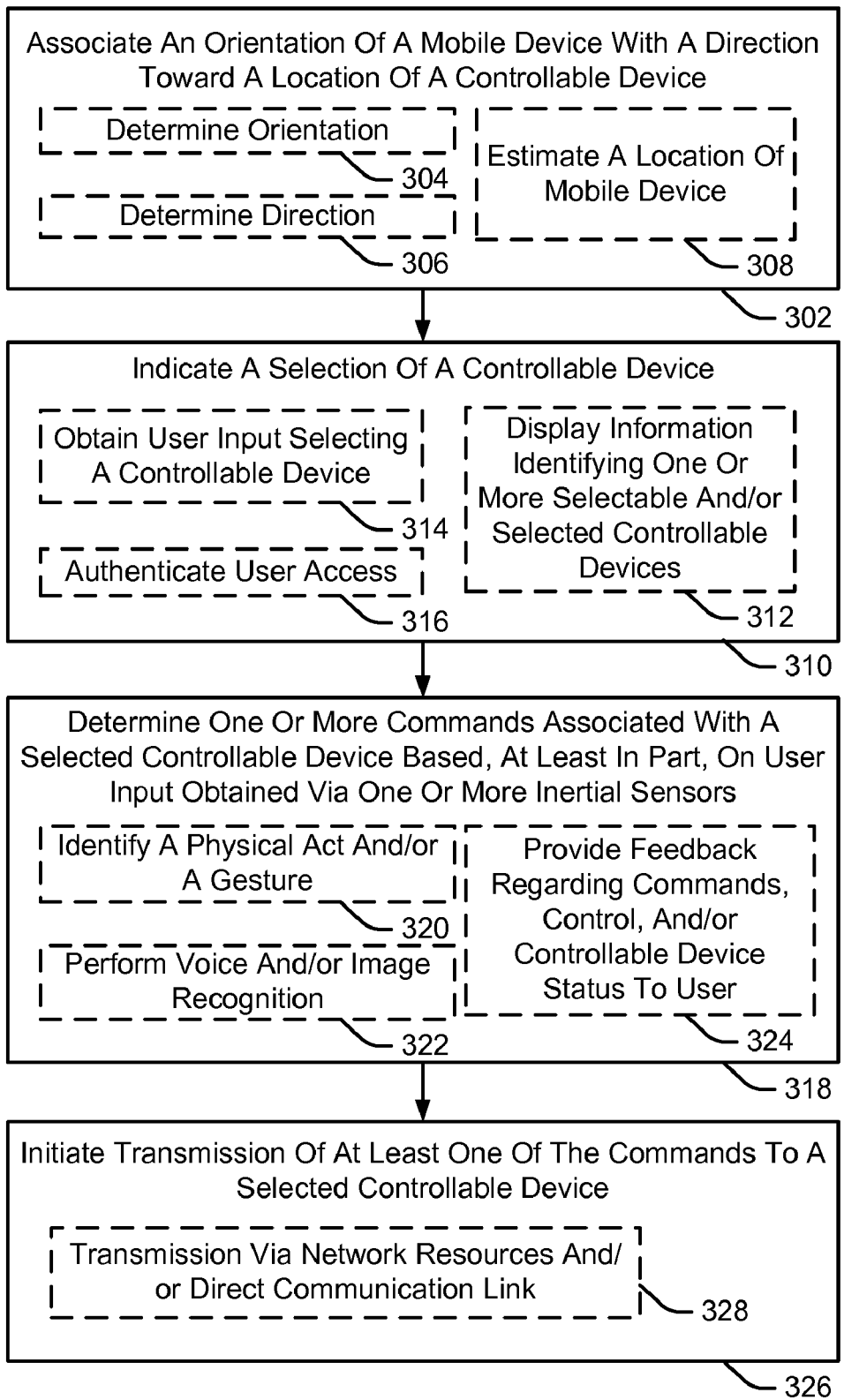
FIG. 3 is a functional flow diagram illustrating certain features of an exemplary gesture based remote control process, in accordance with an implementation.

Attention is drawn next to FIG. 3, which is flow diagram illustrating an example process 300 for use in a mobile device to select and control a controllable device, in accordance with an implementation.

At block 302, an orientation of a mobile device may be associated with a direction toward a location of a controllable device. For example, at block 304 an orientation of the mobile device may be determined, e.g., using one or more techniques as described herein. At block 306, a direction may be determined, e.g., using one or more techniques as described herein. At block 308, the location of mobile device may be estimated or otherwise determined, e.g., using one or more techniques as described herein.

At block 310, a selection of at least one controllable device may be indicated, e.g., using one or more techniques as described herein. For example, at block 312 information identifying one or more selectable and/or selected controllable devices may be displayed. For example, at block 314 user input selecting a controllable device may be obtained. For example, at block 316 user access to a controllable device and/or supporting resource/service may be obtained.

At block 318 one or more commands associated with a selected controllable device may be determined based, at least in part, on user input obtained via one or more inertial sensors, e.g., using one or more techniques as described herein. For example, at block 320 a physical act and/or a gesture may be identified. For example, at block 322 voice and/or image recognition data processes may be performed. For example, at block 324 feedback regarding one or more command(s), control, controllable device status, and/or other information may be provided to a user.

At block 326 transmission of at least one of the commands to a selected controllable device may be initiated, e.g., using one or more techniques as described herein. For example, at block 328 transmission of one or more signals and/or messages may be performed via one or more networks/network resources, and/or direct communication link.

Figure 4:
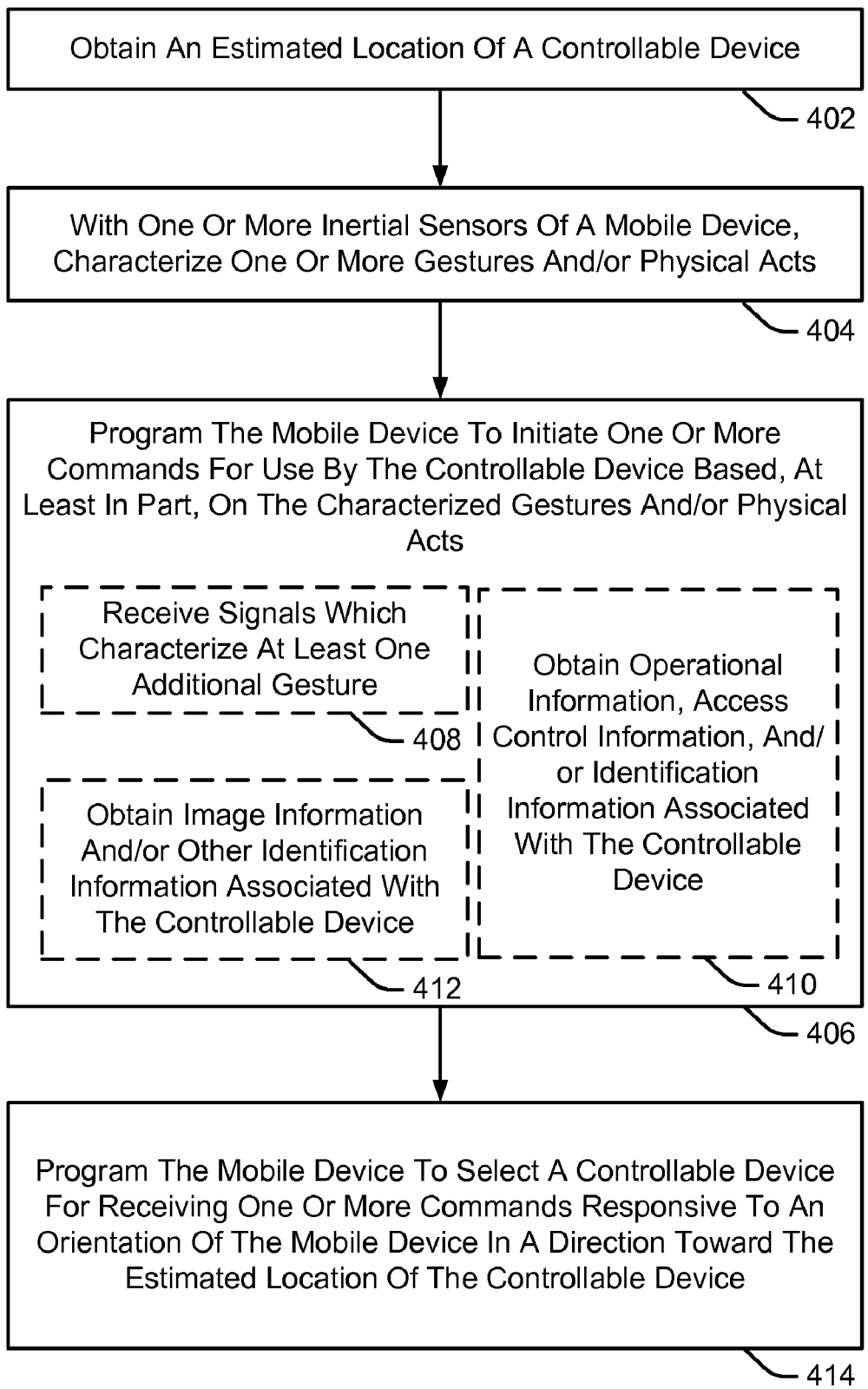
FIG. 4 is a functional flow diagram illustrating certain features of an exemplary gesture based remote control learning process, in accordance with an implementation.

Attention is drawn next to FIG. 4, which is flow diagram illustrating an example process 400 for use in a mobile device to enable (e.g., train) the mobile device to select and control a controllable device, in accordance with an implementation. At block 402 a (estimated) location of a controllable device may be obtained, e.g., using one or more techniques as described herein.

At block 404 one or more gestures and/or physical acts may be characterized using one or more inertial sensors of a mobile device, e.g., using one or more techniques as described herein.

At block 406 a mobile device may be programmed or otherwise enabled to initiate one or more commands for use by the controllable device based, at least in part, on the characterized gestures and/or physical acts. For example, at block 408 a mobile device may receive signals which characterize at least one additional gesture, e.g., using one or more techniques as described herein. For example, at block 410, operational information, access control information, and/or identification information associated with the controllable device may be obtained, e.g., using one or more techniques as described herein. For example, at block 412, image information and/or other identification information associated with the controllable device may be obtained, e.g., using one or more techniques as described herein.

At block 414, a mobile device may be programmed or otherwise enabled to select a controllable device for receiving one or more commands responsive to an orientation of the mobile device in a direction toward the estimated location of the controllable device, e.g., using one or more techniques as described herein.

Figure 5:
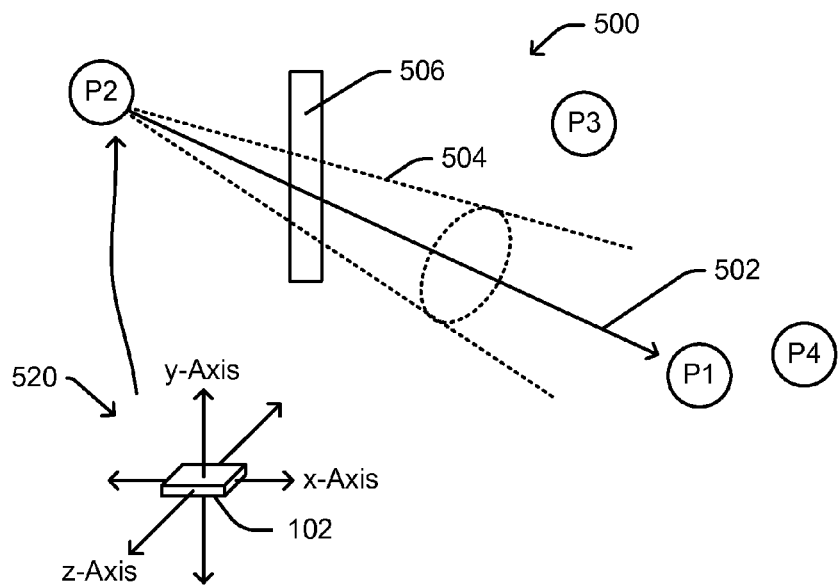
FIG. 5 is an illustrative diagram showing certain example features of an arrangement that includes a mobile device remotely selecting/controlling one or more controllable devices, in accordance with an implementation.

Attention is drawn next to FIG. 5, which is an illustrative diagram graphically showing certain aspects of the example techniques as described herein for use by a mobile device to select and control a controllable device, in accordance with an implementation.

FIG. 5 shows an arrangement 500 wherein a controllable device is located at position P1 and a mobile device is located at position P2. As illustrated, a direction from the mobile device at P2 to the controllable device at P1 may be represented by a line 502 from P2 towards P1, and/or a directional region of space 504. It should be noted that while directional region of space 504 is illustrated here using a cone shape, this is just an example, and indeed, directional region of space 504 may take of various shapes and volumes and may or may not be contiguous and/or homogeneous. In certain example implementations, line 502 and/or directional region of space 504 may be shaped in some manner based on map information, surface information, etc. In certain example implementations, line 502 and/or directional region of space 504 may be shaped in some manner to account for various errors and/or other like information. For example, in FIG. 5, directional region of space 504 may be shaped based on error information and/or threshold information relating to a location estimate, an orientation determination, sensor capabilities, a user preference, etc. Additionally, as illustrated, all or part of line 502 and/or directional region of space 504 may pass through one or more obstacles 506.

An example orientation 520 of a mobile device 102 (here represented by a block) is also shown in FIG. 5 as having an x-Axis, a y-Axis, and a z-Axis. Of course other orientation/coordinate systems may be used.

FIG. 5 also illustrates that a plurality of controllable devices may be provided, for example, at positions P3 and P4. Here, a controllable device located at position P3 is illustrated as falling outside of directional region of space 504 and/or along or nearby line 502. Hence, the controllable device at P3 may not be currently selected and/or controlled. However, the controllable device located at position P4 may be selected as it appears to fall inside of directional region of space 504 and/or may be along or sufficiently nearby line 502. Thus, in this example, a user of the mobile device may provide user input to select between the controllable devices at positions P1 and P4.

In certain example implementations, it may be useful for a mobile device to interrupt or otherwise affect any of the above selection and/or control processes upon determining that a location and/or an orientation of the mobile station has changed enough since such process was initiated that the direction toward a location of a controllable device is less certain. For example, a threshold location and/or orientation may be established to determine if an interruption may be desired.

In certain example implementations, it may be useful for a mobile device to interrupt or otherwise affect any of the above selection and/or control processes based, at least in part, upon one or more other functions of the device. For example, a mobile device with telephone capabilities may indicate that a telephone call has arrived and as such one or more of the selection and/or control processes presented herein may be interrupted to allow the user to accept the incoming telephone call without unintentionally creating or affecting a gesture-based command.

In certain example implementations, it may be useful for a mobile device to interrupt or otherwise affect any of the above selection and/or control processes upon passage of a threshold amount of time since such process was initiated.

In certain example implementations, it may be useful for a mobile device to interrupt or otherwise affect any of the above selection and/or control processes upon determining that a location of a controllable device may have changed. For example, a controllable device may be moved from one room to another and it may be useful for a mobile device to obtain information indicative of such relocation. Here, for example, a controllable device may provide such information to the mobile device and/or some other device on the network. In certain instances, a network resource may detect that a controllable device has moved or changed in some manner and in response provide corresponding information to one or more devices and/or the mobile device. Such information may, for example, identify that a controllable device has moved and possibly include new location information. Such information may, for example, identify that a controllable device is not currently available, etc.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   estimating a location of a mobile device based, at least in part, on one or more received signals;

associating an orientation of a mobile device with a direction toward a location of a controllable device, said direction being determined based, at least in part, on said estimated location of said mobile device and said orientation of said mobile device;

indicating a selection of said controllable device;

determining one or more commands associated with said selected controllable device based, at least in part, on user input obtained via one or more inertial sensors of said mobile device; and initiating transmission of said commands to said selected controllable device.

2. The method as recited in claim 1, and further comprising:

determining said orientation based, at least in part, on signals associated with at least one of: said one or more inertial sensors, a location service receiver, a compass, and/or a magnetometer.

3. The method as recited in claim 2, wherein said one or more inertial sensors comprises at least one at least one of: an accelerometer, a gyroscope, and/or a barometer.

4. The method as recited in claim 1, wherein said one or more signals are received with a location service receiver.

5. The method as recited in claim 1, wherein said direction comprises a directional region of space and further comprising:

indicating that said location of said controllable device is within said directional region of space.

6. The method as recited in claim 1, and further comprising:

displaying information identifying at least said controllable device; and obtaining user input associated with said selection of said controllable device via at least one of: an interactive or touch-screen display, a microphone, a camera, a button or keypad, and/or at least one of said one or more inertial sensors.

7. The method as recited in claim 6, and further comprising:

displaying information identifying at least one other selectable controllable device.

8. The method as recited in claim 6, and further comprising:

authenticating that a user may select and/or control said controllable device based, at least in part, on said user input.

9. The method as recited in claim 1, and further comprising:

indicating said selection of said controllable device via at least one of a visual interface, an audio interface, and/or a tactile interface.

10. The method as recited in claim 1, wherein said one or more commands identify at least one of: at least one physical act performed by a person, and/or at least one physical gesture performed using said mobile device, as determined based, at least in part, on one or more signals associated with said one or more inertial sensors.

11. The method as recited in claim 10, wherein said at least one physical act results in at least one of an identifiable audio waveform and/or an identifiable visual image.

12. The method as recited in claim 11, wherein said at least one physical act is identified based, at least in part, on signals associated with at least one of: a microphone and/or a camera of said mobile device.

13. The method as recited in claim 1, and further comprising:

obtaining said one or more commands associated with said selected controllable device from at least one of: previously stored data, said controllable device, and/or from one or more other devices.

14. The method as recited in claim 1, and further comprising:

obtaining status information associated with said selected controllable device via a network interface; and presenting feedback to a user based, at least in part, on said status information.

15. The method as recited in claim 1, and further comprising at least one of:

transmitting one or more signals representing said commands to at least one other device via a network interface, and/or to said selected controllable device via a network interface and/or a direct communication link.

16. A method comprising:

with a mobile device:

obtaining an estimated location of a controllable device;

processing signals from one or more inertial sensors of said mobile device to characterize one or more gestures;

programming said mobile device to initiate transmission of one or more commands to said controllable device based, at least in part, on said characterized one or more gestures; and programming said mobile device to select said controllable device for receiving said one or more commands responsive to an orientation of said mobile device with a direction toward said estimated location of said controllable device, said direction being determined based, at least in part, on an estimated location of said mobile device and said orientation of said mobile device, wherein said estimated location of said mobile device is based, at least in part, on one or more received signals.

17. The method as recited in claim 16, and further comprising:

receiving signals which characterize at least one additional gesture of said one or more gestures.

18. The method as recited in claim 16, and further comprising:

obtaining at least one of: operational information associated with said controllable device; access control information associated with controllable device; and/or identification information associated with said controllable device.

19. The method as recited in claim 16, and further comprising:

via a camera of said mobile device, obtaining at least one of: image information associated with said controllable device; and/or identification information associated with said controllable device.

20. An apparatus comprising:

means for estimating a location of a mobile device based, at least in part, on one or more received signals;

means for associating an orientation of a mobile device with a direction toward a location of a controllable device, said direction being determined based, at least in part, on said estimated location of said mobile device and said orientation of said mobile device;

means for indicating a selection of said controllable device;

means for determining one or more commands associated with said selected controllable device based, at least in part, on user input affecting inertial motion of said mobile device; and means for initiating transmission of said commands to said selected controllable device.

21. The apparatus as recited in claim 20, and further comprising:
means for determining said orientation.

22. The apparatus as recited in claim 20, wherein said direction comprises a directional region of space and further comprising:
means for indicating that said location of said controllable device is within said directional region of space.

23. The apparatus as recited in claim 20, and further comprising:
means for displaying information identifying at least said controllable device; and
means for obtaining user input associated with said selection of said controllable device.

24. The apparatus as recited in claim 23, and further comprising:
means for displaying information identifying at least one other selectable controllable device.

25. The apparatus as recited in claim 23, and further comprising:
means for authenticating that a user may select and/or control said controllable device.

26. The apparatus as recited in claim 20, and further comprising:
means for indicating said selection of said controllable device.

27. The apparatus as recited in claim 20, wherein said one or more commands identify at least one of: at least one physical act performed by a person, and/or at least one physical gesture performed using said mobile device.

28. The apparatus as recited in claim 27, wherein said at least one physical act results in at least one of an identifiable audio waveform and/or an identifiable visual image.

29. The apparatus as recited in claim 20, and further comprising:
means for obtaining said one or more commands associated with said selected controllable device from at least one of: previously stored data, said controllable device, and/or from one or more other devices.

30. The apparatus as recited in claim 20, and further comprising:
means for obtaining status information associated with said selected controllable device via a network interface; and
means for presenting feedback to a user based, at least in part, on said status information.

31. The apparatus as recited in claim 20, and further comprising at least one of:
means for transmitting one or more signals representing said commands to at least one other device, and/or to said selected controllable device via a direct communication link.

32. An apparatus for use in a mobile device comprising:
means for obtaining an estimated location of a controllable device;
means for processing signals from one or more inertial sensors of said mobile device to characterize one or more gestures;
means for programming said mobile device to initiate transmission of one or more commands to said controllable device based, at least in part, on said characterized one or more gestures; and
means for programming said mobile device to select said controllable device for receiving said one or more commands responsive to an orientation of said mobile device with a direction toward said estimated location of said controllable device, said direction being determined based, at least in part, on an estimated location of said mobile device and said orientation of said mobile device, wherein said estimated location of said mobile device is based, at least in part, on one or more received signals.

33. The apparatus as recited in claim 32, and further comprising:
means for receiving signals which characterize at least one additional gesture of said one or more gestures.

34. The apparatus as recited in claim 32, and further comprising:
means for obtaining at least one of: operational information associated with said controllable device; access control information associated with controllable device; and/or identification information associated with said controllable device.

35. The apparatus as recited in claim 32, and further comprising:
means for obtaining at least one of: image information associated with said controllable device; and/or identification information associated with said controllable device.

36. A mobile device comprising:
memory;
a network interface;
a location service receiver;
one or more inertial sensors;
at least one user interface; and
at least one processing unit to: estimate a location of said mobile device based, at least in part, on one or more signals received via at least one of said network interface or said location service receiver; associate an orientation of said mobile device with a direction toward a location of a controllable device as stored in said memory, said direction being determined based, at least in part, on said estimated location of said mobile device and said orientation of said mobile device; indicate a selection of said controllable device via said at least one user interface; determine one or more commands associated with said selected controllable device based, at least in part, on user input obtained via said one or more inertial sensors; and initiate transmission of said commands to said selected controllable device via said network interface.

37. The mobile device as recited in claim 36, and further comprising:
at least one of: a compass, and/or a magnetometer; and
wherein said at least one processing unit to further determine said orientation based, at least in part, on signals associated with at least one of: said one or more inertial sensors, said location service receiver, said compass, and/or said magnetometer.

38. The mobile device as recited in claim 37, wherein said one or more inertial sensors comprises at least one at least one of: an accelerometer, a gyroscope, and/or a barometer.

39. The mobile device as recited in claim 1, and wherein said at least one processing unit to further determine said direction based, at least in part, on said estimated location of said mobile device and said orientation.

40. The mobile device as recited in claim 36, wherein said direction comprises a directional region of space and wherein said at least one processing unit to further determine that said location of said controllable device is within said directional region of space.

41. The mobile device as recited in claim 36, and wherein said at least one processing unit to further: display information identifying at least said controllable device via said at least one user interface; and obtain user input associated with said selection of said controllable device via at least one of: an interactive or touch-screen display, a microphone, a camera, a button or keypad, and/or at least one of said one or more inertial sensors.

42. The mobile device as recited in claim 41, and wherein said at least one processing unit to further display information identifying at least one other selectable controllable device via said at least one user interface.

43. The mobile device as recited in claim 41, and wherein said at least one processing unit to further authenticate that a user may select and/or control said controllable device based, at least in part, on said user input.

44. The mobile device as recited in claim 36, and wherein said at least one processing unit to further indicate said selection of said controllable device via said at least one user interface, said at least one user interface comprising at least one of: a visual interface; an audio interface; and/or a tactile interface.

45. The mobile device as recited in claim 36, wherein said one or more commands identify at least one of: at least one physical act performed by a person, and/or at least one physical gesture performed using said mobile device, as determined based, at least in part, on one or more signals associated with said one or more inertial sensors.

46. The mobile device as recited in claim 45, wherein said at least one physical act results in information representing at least one of an audio waveform and/or an visual image that is identifiable by said at least one processing unit.

47. The mobile device as recited in claim 46, and further comprising:
at least one of a microphone and/or a camera; and
wherein said at least one physical act is identifiable based, at least in part, on signals associated with at least one of: said microphone and/or said camera.

48. The mobile device as recited in claim 36, and wherein said at least one processing unit to further obtain said one or more commands associated with said selected controllable device from one or more other devices via said network interface.

49. The mobile device as recited in claim 36, and wherein said at least one processing unit to further: obtain status information associated with said selected controllable device via said network interface; and present feedback to a user based, at least in part, on said status information.

50. A mobile device comprising:
one or more inertial sensors; and
at least one processing unit to: obtain an estimated location of a controllable device; process signals from said one or more inertial sensors of said mobile device to characterize one or more gestures; identify one or more commands for use by said controllable device based, at least in part, on said characterized one or more gestures; and identify said controllable device for receiving said one or more commands responsive to an orientation of said mobile device with a direction toward said estimated location of said controllable device, said direction being determined based, at least in part, on an estimated location of said mobile device and said orientation of said mobile device, wherein said estimated location of said mobile device is based, at least in part, on one or more received signals.

51. The mobile device as recited in claim 50, and further comprising:
a network interface; and
wherein said at least one processing unit to further obtain signals via said network interface which characterize at least one additional gesture of said one or more gestures.

52. The mobile device as recited in claim 50, and further comprising:
a network interface; and
wherein said at least one processing unit to further obtain via said network interface at least one of: operational information associated with said controllable device; access control information associated with controllable device; identification information associated with said controllable device; and/or said estimated location of said controllable device.

53. The mobile device as recited in claim 50, and further comprising:
a camera; and
wherein said at least one processing unit to further obtain via said camera at least one of: image information associated with said controllable device; and/or identification information associated with said controllable device.

54. The mobile device as recited in claim 50, and further comprising:
a location service receiver; and
wherein said at least one processing unit to further determine said estimated location of said controllable device based, at least in part, on one or more signals associated with said location service receiver.

55. An article comprising:
a computer readable medium having computer implementable instructions stored thereon which are executable by at least one processing unit in a mobile device to:
estimate a location of said mobile device based, at least in part, on one or more received signals;
associate an orientation of said mobile device with a direction toward a location of a controllable device, said direction being determined based, at least in part, on said estimated location of said mobile device and said orientation of said mobile device;
indicate a selection of said controllable device;
determine one or more commands associated with said selected controllable device based, at least in part, on user input obtained via said one or more inertial sensors; and
initiate transmission of said commands to said selected controllable device.

56. The article as recited in claim 55, and wherein said computer implementable instructions are executable by said at least one processing unit to further:
determine said orientation based, at least in part, on signals associated with at least one of: said one or more inertial sensors, a location service receiver, a compass, and/or a magnetometer.

57. The article as recited in claim 56, wherein said one or more inertial sensors comprises at least one at least one of: an accelerometer, a gyroscope, and/or a barometer.

58. The article as recited in claim 55, wherein said one or more signals are received with a location service receiver.

59. The article as recited in claim 55, wherein said direction comprises a directional region of space and wherein said computer implementable instructions are executable by said at least one processing unit to further:
determine that said location of said controllable device is within said directional region of space.

60. The article as recited in claim 55, and wherein said computer implementable instructions are executable by said at least one processing unit to further:

initiate display of information identifying at least said controllable device; and obtain user input associated with said selection of said controllable device via at least one of: an interactive or touch-screen display, a microphone, a camera, a button or keypad, and/or at least one of said one or more inertial sensors.

61. The article as recited in claim 60, and wherein said computer implementable instructions are executable by said at least one processing unit to further:

initiate display of information identifying at least one other selectable controllable device.

62. The article as recited in claim 60, and wherein said computer implementable instructions are executable by said at least one processing unit to further:

authenticate that a user may select and/or control said controllable device based, at least in part, on said user input.

63. The article as recited in claim 55, and wherein said computer implementable instructions are executable by said at least one processing unit to further:

initiate an indication said selection of said controllable device via at least one of a visual interface, an audio interface, and/or a tactile interface.

64. The article as recited in claim 55, wherein said one or more commands identify at least one of: at least one physical act performed by a person, and/or at least one physical gesture performed using said mobile device, as determined based, at least in part, on one or more signals associated with said one or more inertial sensors of said mobile device.

65. The article as recited in claim 64, wherein said at least one physical act results in at least one of an audio waveform and/or an visual image identifiable by said at least one processing unit executing said computer implementable instructions.

66. The article as recited in claim 65, wherein said at least one physical act is identified based, at least in part, on signals associated with at least one of: a microphone and/or a camera of said mobile device.

67. The article as recited in claim 55, and wherein said computer implementable instructions are executable by said at least one processing unit to further:

obtain said one or more commands associated with said selected controllable device from at least one of: previously stored data, said selected controllable device, and/or from one or more other devices.

68. The article as recited in claim 55, and wherein said computer implementable instructions are executable by said at least one processing unit to further:

obtain status information associated with said selected controllable device via a network interface; and initiate presentation of feedback to a user based, at least in part, on said status information.

69. The article as recited in claim 55, and wherein said computer implementable instructions are executable by said at least one processing unit to further:

initiate transmission of one or more signals representing said commands to at least one other device via a network interface, and/or to said selected controllable device via a network interface and/or a direct communication link.

70. An article comprising:

a computer readable medium having computer implementable instructions stored thereon which are executable by at least one processing unit in a mobile device to:

obtain an estimated location of a controllable device;

process signals from said one or more inertial sensors of said mobile device to characterize one or more gestures;

identify one or more commands for use by said controllable device based, at least in part, on said characterized one or more gestures; and identify said controllable device for receiving said one or more commands responsive to an orientation of said mobile device with a direction toward said estimated location of said controllable device, said direction being determined based, at least in part, on an estimated location of said mobile device and said orientation of said mobile device, wherein said estimated location of said mobile device is based, at least in part, on one or more received signals.

71. The article as recited in claim 70, and wherein said computer implementable instructions are executable by said at least one processing unit to further:

obtain signals which characterize at least one additional gesture of said one or more gestures.

72. The article as recited in claim 70, and wherein said computer implementable instructions are executable by said at least one processing unit to further:

obtain at least one of: operational information associated with said controllable device; access control information associated with controllable device; identification information associated with said controllable device; and/or said estimated location of said controllable device.

73. The article as recited in claim 70, and wherein said computer implementable instructions are executable by said at least one processing unit to further:

obtain via a camera of said mobile device at least one of: image information associated with said controllable device; and/or identification information associated with said controllable device.

74. The article as recited in claim 70, and wherein said computer implementable instructions are executable by said at least one processing unit to further:

determine said estimated location of said controllable device based, at least in part, on one or more signals associated with a location service receiver.

* * * * *